United States Patent [19]

Bossard

[11] Patent Number: 5,353,366
[45] Date of Patent: Oct. 4, 1994

[54] OPTICAL FIBER SPLICING STATION

[75] Inventor: Ronald G. Bossard, Austin, Tex.

[73] Assignee: Minnesota Mining and Manufacturing Company, St. Paul, Minn.

[21] Appl. No.: 131,691

[22] Filed: Oct. 5, 1993

[51] Int. Cl.[5] .......................... G02B 6/00; G02B 6/36
[52] U.S. Cl. ..................................... 385/134; 385/95; 385/96; 385/98; 385/135; 385/136; 385/137
[58] Field of Search .................. 385/95, 96, 97, 98, 385/99, 134, 135, 137, 136

[56] References Cited

U.S. PATENT DOCUMENTS

| | | | |
|---|---|---|---|
| 4,627,686 | 12/1986 | Szentesi | 385/135 X |
| 5,115,489 | 5/1992 | Norris | 385/135 |
| 5,142,607 | 8/1992 | Petrotta et al. | 385/135 |
| 5,146,527 | 9/1992 | Mallinson | 385/96 X |
| 5,155,794 | 10/1992 | Nolf et al. | 385/135 |
| 5,222,183 | 6/1993 | Daems et al. | 385/135 |
| 5,241,617 | 8/1993 | Peacock et al. | 385/135 |
| 5,249,253 | 9/1993 | Franckx et al. | 385/135 |
| 5,285,515 | 2/1994 | Milanowski et al. | 385/135 |

FOREIGN PATENT DOCUMENTS 2181270  4/1987  United Kingdom ........... 385/135 X

Primary Examiner—Brian Healy
Attorney, Agent, or Firm—Gary L. Griswold; Walter N. Kirn; Jack V. Musgrove

[57] ABSTRACT

An optical fiber splicing station includes a base having a vise for releasably securing a splice management device, such as a splice tray, and means for removably mounting one or more different fiber optic splicing tools. The splicing station provides a compact, portable platform which facilitates installation of the splice, particularly in difficult locations such as aerial or buried closures, and high-density environments. The base further has means for receiving an optical fiber cleaver at one of several different locations, to accommodate placement of the splicing tool, or simply for user convenience. Means may also be provided to mount the base to a splice case, tripod, or splicing rig support. Torsional stress, which might otherwise be induced on the fibers during installation of the splice onto the splice management device, is minimized by positioning the device close to the splicing tool, and by orienting the lengthwise direction of the device with the direction of the fibers which are held by the splice tool (on the base) during the splice operation. After a splice has been actuated, it may be removed from the tool and placed on the device in a single step, and the torsional stress is distributed evenly over the final coil of slack fiber stored in the device, with no opposing torsional stresses developed in the spliced fiber coils.

21 Claims, 5 Drawing Sheets

OPTICAL FIBER SPLICING STATION

BACKGROUND OF THE INVENTION

1. Field of the Invention

The present invention generally relates to the interconnection of optical fibers used in telecommunications, and more particularly to a portable tool used to splice optical fibers and install the splices in fiber organizers or trays.

2. Description of the Prior Art

Optical fibers have now surpassed copper wire as the preferred medium for telecommunications. As with copper wire, it often becomes necessary to interconnect optical fibers, for example, during installation or repair. The present invention is directed to a portable station which may be used by the craftsperson to complete and install such interconnections. In this regard, a fiber optic "connector" often refers to a device which allows repeatable engagement and disengagement of the cable, while a "splice" typically refers to a device which is used for the permanent attachment of two cable ends. These terms should not, however, be construed in a limiting sense as used herein since the present invention is applicable to the installation of all classes of fiber optic interconnection devices.

The prior art includes large bench-top work areas (in buildings or mobile splicing vans) in which to lay out the equipment and tools necessary for splicing optical fibers, but this clearly requires significant space as well as access and permanently installed equipment. While one fusion splice manufacturer has provided support brackets that may position a splice tray behind the rear housing wall of the fusion splicer, this has not sufficiently eased the splicing operation in inconvenient locations, such as aerial terminals or closures, buried vaults, or rack-mounted patch panels. Fusion splicers also require a significant source of electrical power, which limits the applications in which a fusion splicer may be used.

The prior art also recognizes that it is generally desirable to minimize handling of fiber in order to reduce possible damage, and particularly to refrain from bending or twisting the fibers, which can induce torsional stresses leading to optical losses. The prior art has not, however, specifically addressed these concerns with respect to splicing techniques and the synergistic placement of splicing equipment. It would, therefore, be desirable and advantageous to devise a method and apparatus which positions splicing equipment so as to minimize development of torsional stresses, and which further simplifies the entire splicing operation in high-density, buried or aerial settings.

SUMMARY OF THE INVENTION

The present invention provides an optical fiber splicing station generally comprising a base having an upper surface, a fiber splicing tool removably attached to the upper surface of the base, and means for releasably affixing a splice management device, such as a splice tray or organizer, to the upper surface of the base. The base may be designed to secure one of two or more different splicing tools, such as a tool for actuating discrete optical splices and another tool for actuating multi-fiber splices. The base further preferably has means for receiving an optical fiber cleaver at one of several different locations, to accommodate placement of the splicing tool, or simply for user convenience. Means may also be provided to mount the base to a splice case, tripod, or splicing rig support.

The splice management device may be affixed to the base by a vise-like mechanism comprising a bar slidably mounted along a cutout formed in the base, and a threaded rod engaging a hole in the bar, the rod being rotatably mounted to the base at one end and extending generally along the cutout such that rotating the rod causes the bar to slide. One or more stop members are fixed to the base, and one or more stop members are formed on the bar. In this manner, when a knob attached to the rod is twisted and the bar moves toward the tightened position, the stop members on the bar forcibly urge the device toward the fixed stop members until the device is securely held between the stops. The stops may include spacers which provide a clearance between the upper surface of the base and the lower surface of the splice management device, to accommodate any downwardly-directed projections on the device.

Torsional stress, which might otherwise be induced on the fibers during installation of the splice onto the splice management device, is minimized with the optical fiber splicing station of the present invention by positioning the device close to the splicing tool, and by orienting the lengthwise direction of the device with the direction of the fibers which are held by the splice tool (on the base) during the splice operation. In this manner, after the splice has been actuated, it may be removed from the tool and placed (inverted) on the device in a single step, and the torsional stress is distributed evenly over the final coil of slack fiber stored in the device. Also, no opposing torsional stresses are developed in the spliced fiber coils.

BRIEF DESCRIPTION OF THE DRAWINGS

The invention will best be understood by reference to the accompanying drawings, wherein.

DESCRIPTION OF THE PREFERRED EMBODIMENT

Figure 1:
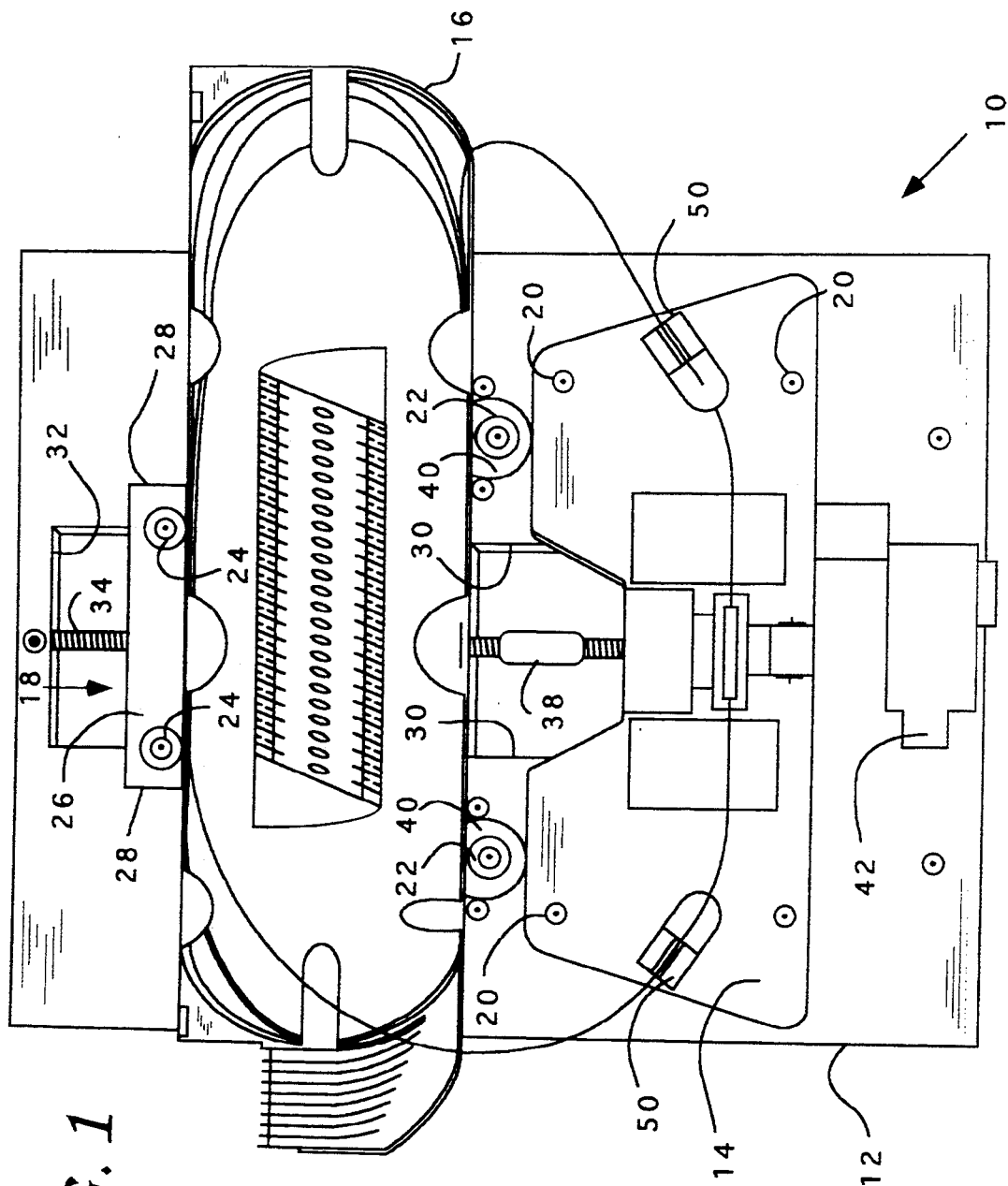
FIG. 1 is a top plan view of one embodiment of the optical fiber splicing station of the present invention.

With reference now to the figures, and in particular with reference to FIG. 1, there is depicted one embodiment 10 of the optical fiber splicing station of the present invention. Splicing station 10 is generally comprised of a rectangular, planar base 12 having a splicing tool 14 removably attached thereto, and a splice management device 16 releasably affixed to base 12 by a vise 18. In the depicted embodiment, splice management device 16 is the splice tray shown in U.S. Pat. No. 5,074,635. The splicing tool depicted in FIG. 1 is that sold by 3M for actuating the FIBRLOK brand discrete optical fiber splice described in U.S. Pat. No. 4,818,055. FIBRLOK is a trademark of Minnesota Mining and Manufacturing Co. (3M), assignee of the present invention.

Base 12 may be constructed of any durable material, preferably a polymer such as polyethylene. Tool 14 may be secured to base 12 by any convenient means, such as bolts 20 and mounting nuts A (shown in FIG. 3) embedded in base 12. Vise 18 secures tray 16 with four stop members, two of which (22) are fixed to base 12, while the other two (24) are formed on a clamping bar 26. Bar 26 has two edges 28 having grooves which slidably receive (tongue-and-groove) the sidewalls 30 of a generally rectangular cutout 32 formed in base 12; the length of bar 26 is approximately equal to the width of cutout 32. The location of bar 26 is adjusted by means of a clamp screw or threaded rod 34 which engages a hole passing through bar 26, and generally extends within cutout 32. The other end of rod 34 is mounted on base 12, for example, in a retainer 36 having a hole therein (see FIGS. 2 and 3), so that it is free to rotate. A knurled knob 38 is fixed to rod 34 (e.g., with a set screw) such that, when knob 38 is twisted, rod 34 rotates and causes bar 26 to advance in one direction or another along cutout 32, depending upon the direction of rotation (clockwise or counterclockwise) of rod 34. Spacers 40 may be provided under stop members 22 to provide a clearance between the upper surface of base 12 and the lower surface of tray 16, in order to accommodate any downwardly-directed projections of tray 16. No spacers are needed near stop members 24 since bar 26 is raised slightly above the upper surface of base 12.

FIG. 1 also depicts an optical fiber cleaver 42 mounted to base 12. Suitable cleavers include the FIBR-LOK fiber cleaver sold by 3M, which is similar to that shown in U.S. Pat. No. 5,024,363, although it may be modified as disclosed in U.S. patent application Ser. No. 08/38,500. Cleaver 42 may be mounted at different locations on base 12 for user preference, such as by embedding several nuts C (shown in FIG. 3) in base 12, the nuts receiving a bolt attached to the bottom of the cleaver. Those skilled in the art will appreciate how splicing station 10 thus places all of the essential splicing accoutrements in complementary positions on a portable, easily held, common substrate. This aspect of station 10 is particularly important at inconvenient field locations where access is limited and use of a large bench-top splicing workstation is not practical. Such locations include direct buried splices, aerial closure or terminal splices, and maintenance splices in rack-mounted patch panels.

Figure 2:
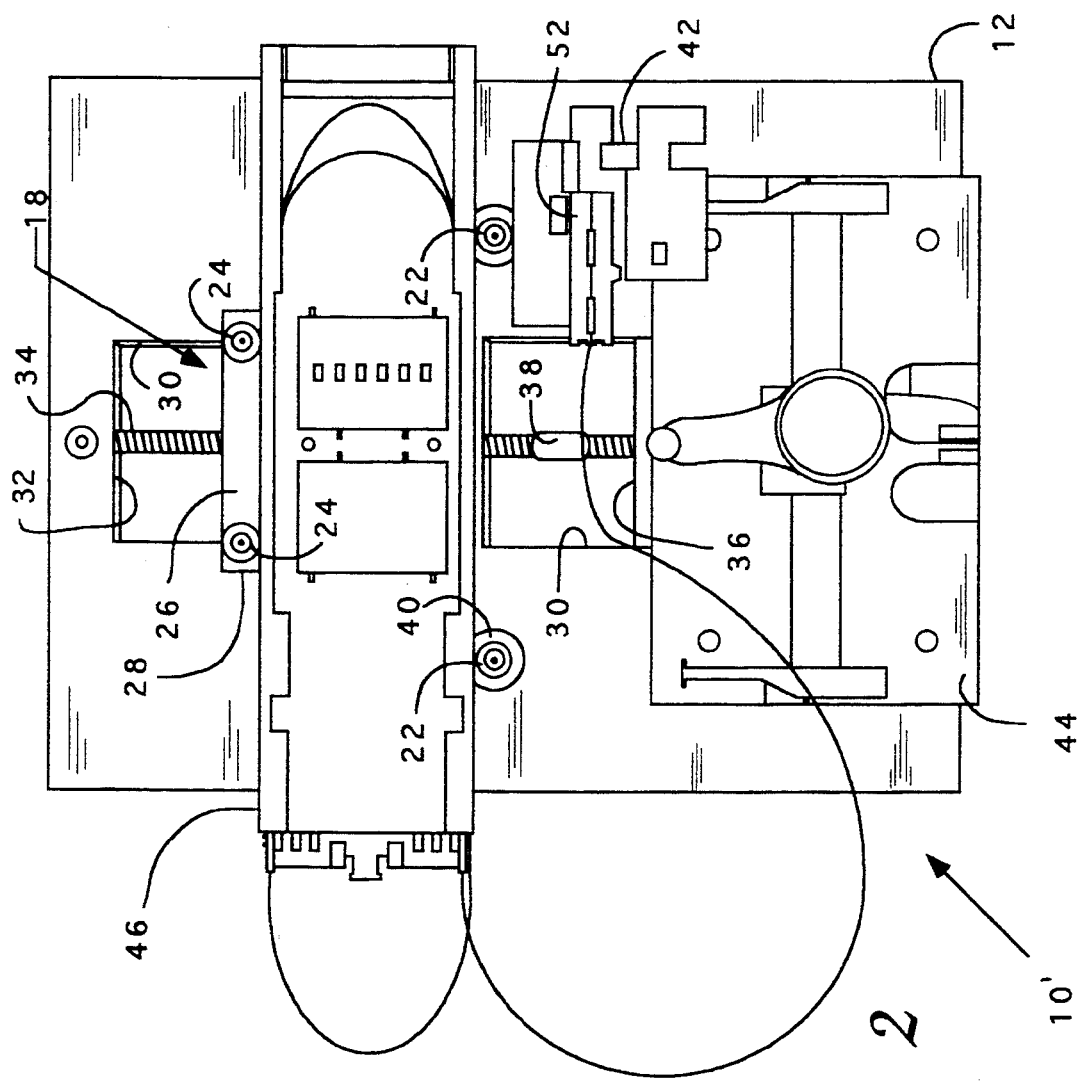
FIG. 2 is a top plan view of another embodiment of the optical fiber splicing station of the present invention.

Referring now to FIG. 2, the splicing station of the present invention may easily be adapted for other splicing situations. For example, an alternative splicing station 10' may be designed for splicing multi-fiber ribbons. Splicing station 10' uses the same base 12 and vise 18, but has a different splicing tool 44. The depicted tool is that described in U.S. Pat. No. 5,191,632, to be used with the FIBRLOK multi-fiber splice disclosed in U.S. Pat. No. 5,155,787. Tool 44 may be mounted to base 12 with the same set of bolts 20, but a different set of nuts B (shown in FIG. 3) is provided for tool 44. A different splice tray 46 is also shown, specifically, the FIBRLOK 2672 multi-fiber high density splice tray. While stop members 22 and 24 are still the same as in splicing station 10, it will be appreciated that the locations of the stop members may be changed to accommodate side projections of splice tray 46 by providing multiple nuts E (shown in FIG. 3) embedded in base 12. FIG. 2 also illustrates the same cleaver 42 configured for multiple fiber cleaving. Cleaver 42 may be mounted at other different locations by means of different nuts D embedded in base 12, as shown in FIG. 3.

Figure 3:
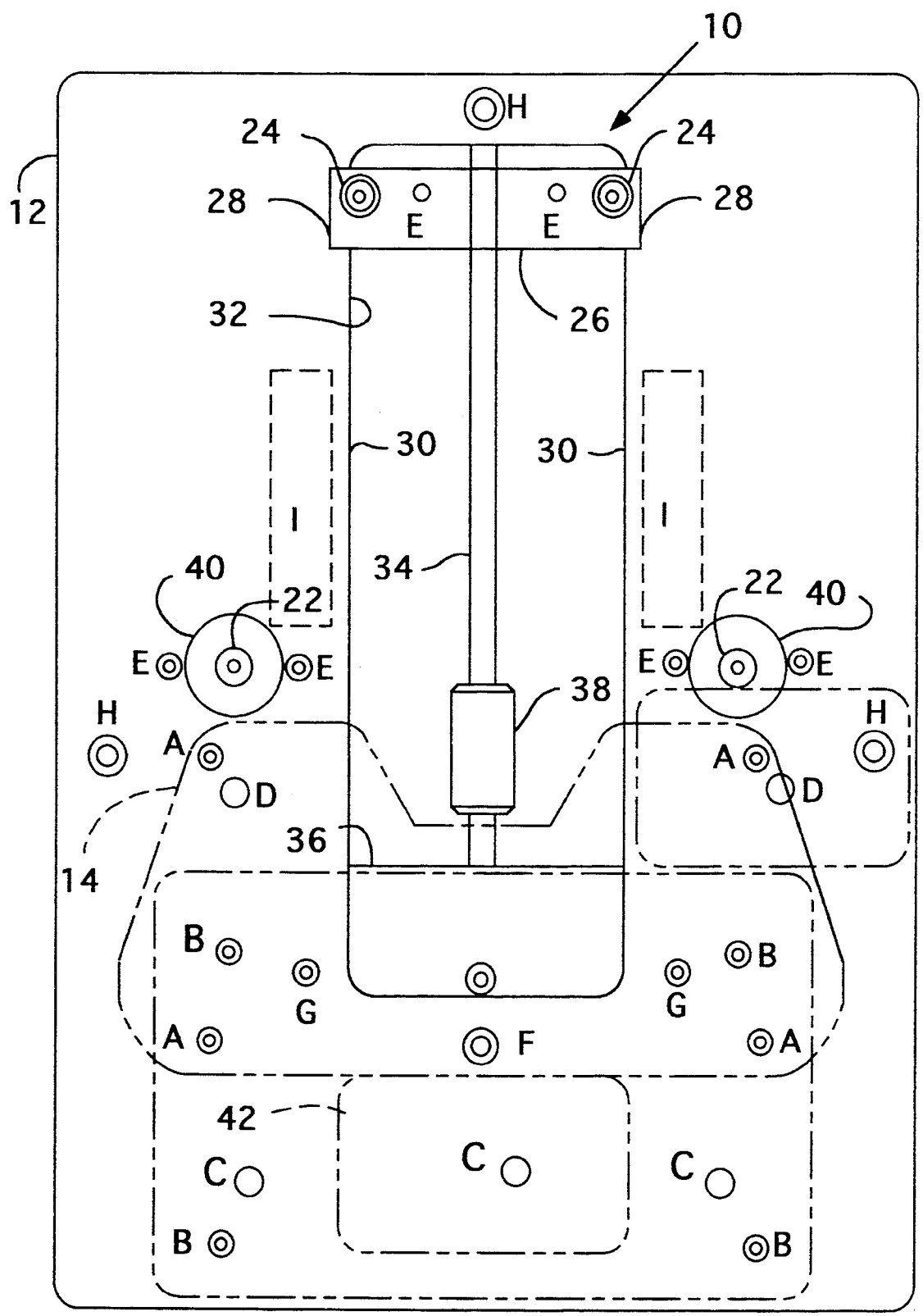
FIG. 3 is a top plan view of the base of the splicing station of the present invention, depicting the various fastener locations for receiving different splicing tools.

FIG. 3 also illustrates several other nuts or mounting means attached to base 12. For example, a standard tripod nut F may be embedded in the lower surface of base 12. Similar nuts G may be used to support base 12 on a splicing rig, such as the 4710 rig sold by 3M. Finally, means may be provided to attach base 12 to a splice case or closure; such means include mounting holes H for receiving, e.g., the bolts in a 2178 splice closure sold by 3M, or DUAL LOCK pads I adhered to the lower surface of base 12 which attach to, e.g., a 2178 closure base pedestal. The DUAL LOCK pads are reclosable adhesive-backed flexible fasteners consisting of continuous plastic strips with fields of mushroom-shaped plastic heads which tightly interlock when pressed together ("DUAL LOCK" is a trademark of 3M).

Figure 4:
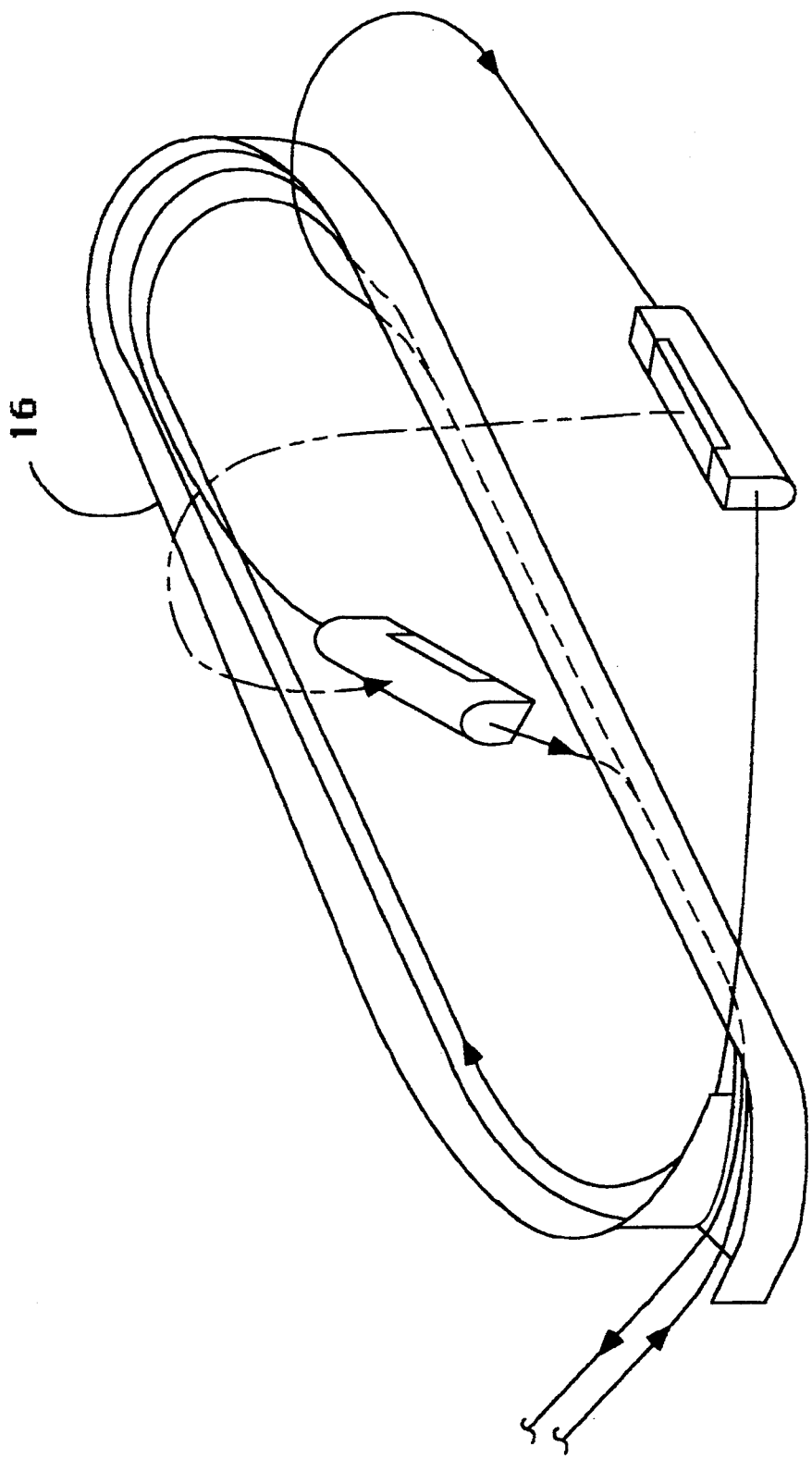
FIG. 4 is a perspective view of a splice organizer tray illustrating installation of the spliced fibers.

With further reference to FIG. 4, those skilled in the art will appreciate that the splicing station of the present invention is advantageous in that it minimizes the development of torsional stresses in the spliced fibers during installation of the splice onto the splice management device. In FIG. 4, splice tray 16 is depicted alone for clarity, although it is understood that the splice installation takes places with tray 16 affixed to base 12 and adjacent splicing tool 14. Also, only a single coil is shown for each fiber, although 2-3 coils are usually stored for each fiber. During the splicing operation, the fibers are held and spliced without any torsional stress. In this regard, splicing tool 14 has two fiber holders 50 each having foam pads which gently retain the fibers. It can be seen from the figures that, when so held by holders 50, the fibers are oriented generally parallel to the lengthwise direction of tray 16. This orientation of the fibers, as well as the proximity of tray 16 to tool 14, simplifies splice installation in addition to minimizing the torsional stresses. Once the splice is completed, it may be removed from tool 14 and retained (inverted 180°) within tray 16 in a single step. Any torsional stress induced during installation is distributed over the extended length of the final fiber coil, and no opposing torsional stresses are developed in the coils. A similar installation operation is used with tool 44 and tray 46. Tool 44 also has a different style of fiber holders 52 which similarly retain the fiber ribbons in an orientation which is generally parallel with the lengthwise direction of tray 46.

Figure 5:
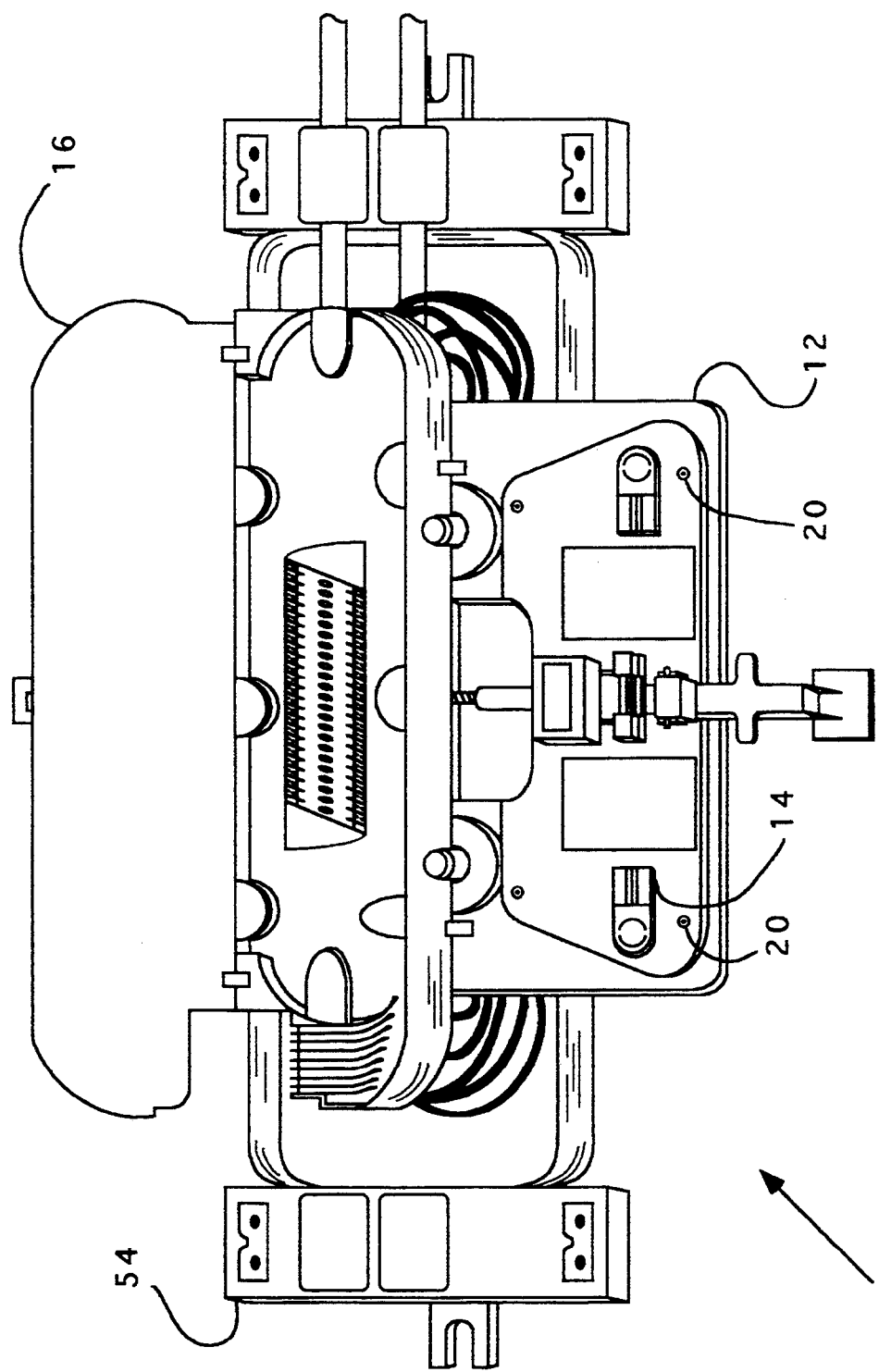
FIG. 5 is a perspective view of the optical fiber splicing station of the present invention mounted to a spice case.

FIG. 5 depicts how the splicing station of the present invention may be mounted onto a splice case. The case shown is 3M's 2178 splice case with cables installed. Splicing station be is mounted onto the base 54 of the splice case using the DUAL LOCK strips I shown in FIG. 3.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the splicing station of the present invention may also be adapted for fusion splicing, as well as for fiber optic connector preparation (e.g., support of an oven for a "hot-melt" ferrule connectors, or polishing machines). It is therefore contemplated that such modifications can be made without departing from the spirit or scope of the present invention as defined in the appended claims.

I claim:

1. An apparatus for facilitating the installation of a fiber optic splice onto a splice management device, comprising:
   a generally planar base member having an upper surface;
   a fiber optic splicing tool removably attached to said upper surface of said base member; and
   means for releasably affixing a splice management device to said upper surface of said base member.

2. The apparatus of claim 1 further comprising means for mounting said base member to a splice case.

3. The apparatus of claim 1 wherein said affixing means includes clamping means having an adjustable clamping bar.

4. The apparatus of claim 1 wherein said base member has:
   a first stop member fixed to said upper surface thereof, proximate said splicing tool; and
   a second stop member mounted to said upper surface of said base member such that said second stop member may be moved with respect to said first stop member.

5. The apparatus of claim 1 wherein said fiber optic splicing tool includes means for actuating a mechanical splice.

6. The apparatus of claim 1 further comprising means for mounting a fiber cleaver on said upper surface of said base member, adjacent said fiber splicing tool.

7. The apparatus of claim 1 wherein:
   said splicing tool comprises a first splicing tool; and
   said base member includes means for removably attaching a second fiber optic splicing tool at a location on said upper surface of said base member different from the location of said first splicing tool.

8. The apparatus of claim 5 wherein:
   said base member has a bar member slidably attached to said upper surface thereof; and
   said second stop member is affixed to said bar member.

9. The apparatus of claim 4 wherein each of said stop members includes a spacer providing a clearance between said upper surface of said base and the splice management device.

10. The apparatus of claim 8 wherein:
    said base member has a cutout therein defining first and second generally parallel sidewalls, said cutout having a width;
    said bar member has first and second generally parallel edges each having a groove therein for slidably receiving said first and second sidewalls, respectively, said edges defining a length of said bar member which is approximately equal to said width of said cutout; and
    said base member further includes means attached thereto for adjusting the location of said bar member along said cutout.

11. The apparatus of claim 10 wherein:
    said bar member has a threaded hole therethrough, said hole extending generally parallel with said edges of said bar member; and
    said adjusting means comprises a threaded rod having first and second ends, said first end passing through said hole, and said second end being rotatably attached to said base member, said rod extending along said cutout.

12. The apparatus of claim 11 further comprising a knob member fixed to said rod.

13. An apparatus for reducing torsional stress during installation of a mechanical fiber optic splice onto an elongate fiber organization tray, the apparatus comprising:
    a generally planar base having an upper surface;
    means for releasably affixing the splice management device to said upper surface of said base;
    a fiber optic splicing tool having at least one fiber holder which, during a splice operation, secures a terminal portion of an optical fiber at a given orientation; and
    means for removably securing said splicing tool to said upper surface of said base such that, when the fiber organization tray is affixed to said upper surface, said orientation of said secured fiber is generally parallel with a lengthwise direction of the fiber organization tray.

14. The apparatus of claim 13 further comprising means for mounting said base to a splice case, said mounting means being attached to a lower surface of said base.

15. The apparatus of claim 13 wherein said base has:
    a generally rectangular cutout therein defining first and second generally parallel sidewalls, said cutout having a width;
    a bar having first and second generally parallel edges each having a groove therein for slidably receiving said first and second sidewalls, respectively, said edges defining a length of said bar which is approximately equal to said width of said cutout, such that said bar may slide along said cutout, said bar further having a threaded hole therethrough, said hole extending generally parallel with said edges of said bar; and
    a threaded rod having first and second ends, extending along said cutout, said first end passing through said hole in said bar, and said second end being rotatably attached to said base such that rotation of said rod causes said bar to slide along said cutout.

16. The apparatus of claim 13 wherein:
    said splicing tool comprises a first splicing tool having means for actuating a discrete optical splice;
    said means for removably securing said splicing tool comprises a first means for securing said first splicing tool; and
    said base further includes second means for removably securing a second fiber optic splicing tool having means for actuating a multi-fiber optical splice and having another fiber holder which, during a splice operation, secures a terminal portion of a multi-fiber ribbon at a given orientation, said second securing means securing said second splicing tool at a location on said upper surface of said base different from the location of said first splicing tool, such that, when the fiber organization tray is affixed to said upper surface, said orientation of said secured ribbon is generally parallel with said lengthwise direction of the fiber organization tray.

17. The apparatus of claim 13 wherein:
    said base has a first stop member fixed to said upper surface thereof, proximate said splicing tool, and a second stop member slidably mounted to said upper surface of said base; and each of said stop members includes a spacer providing a clearance between said upper surface of said base and the splice management device.

18. The apparatus of claim 16 further comprising means for mounting a fiber cleaver on said upper surface of said base at any one of several locations.

19. An optical fiber splicing station comprising:
a first optical fiber splicing tool having means for actuating a discrete optical splice;
a second optical fiber splicing tool having means for actuating a multi-fiber optical splice;
an optical fiber cleaver; and
a generally planar base having
an upper surface,
a lower surface,
first means for removably securing said first splicing tool to said upper surface at a first location,
second means for removably securing said second splicing tool to said upper surface at a second location,
means for removably attaching said cleaver to said upper surface of said base at any one of several locations,
means for releasably affixing a splice tray to said upper surface of said base, and
means, attached to said lower surface of said base, for mounting said base to a splice case.

20. An apparatus for facilitating the installation of a fiber optic splice onto a splice management device, comprising:
a generally planar base member having an upper surface;
a fiber optic splicing tool attached to said upper surface of said base member;
means for releasably affixing a splice management device to said upper surface of said base member;
a first stop member fixed to said upper surface of said base member, proximate said splicing tool; and
a second stop member mounted to said upper surface of said base member such that said second stop member may be moved with respect to said first stop member.

21. An apparatus for facilitating the installation of a fiber optic splice onto a splice management device, comprising:
a generally planar base member having an upper surface;
a fiber optic splicing tool attached to said upper surface of said base member;
means for releasably affixing a splice management device to said upper surface of said base member; and
means for mounting a fiber cleaver on said upper surface of said base member, adjacent said fiber splicing tool.

* * * * *